Dec. 29, 1953        H. H. SPENCER        2,664,538
CURRENT SUPPLY APPARATUS
Filed Sept. 12, 1951
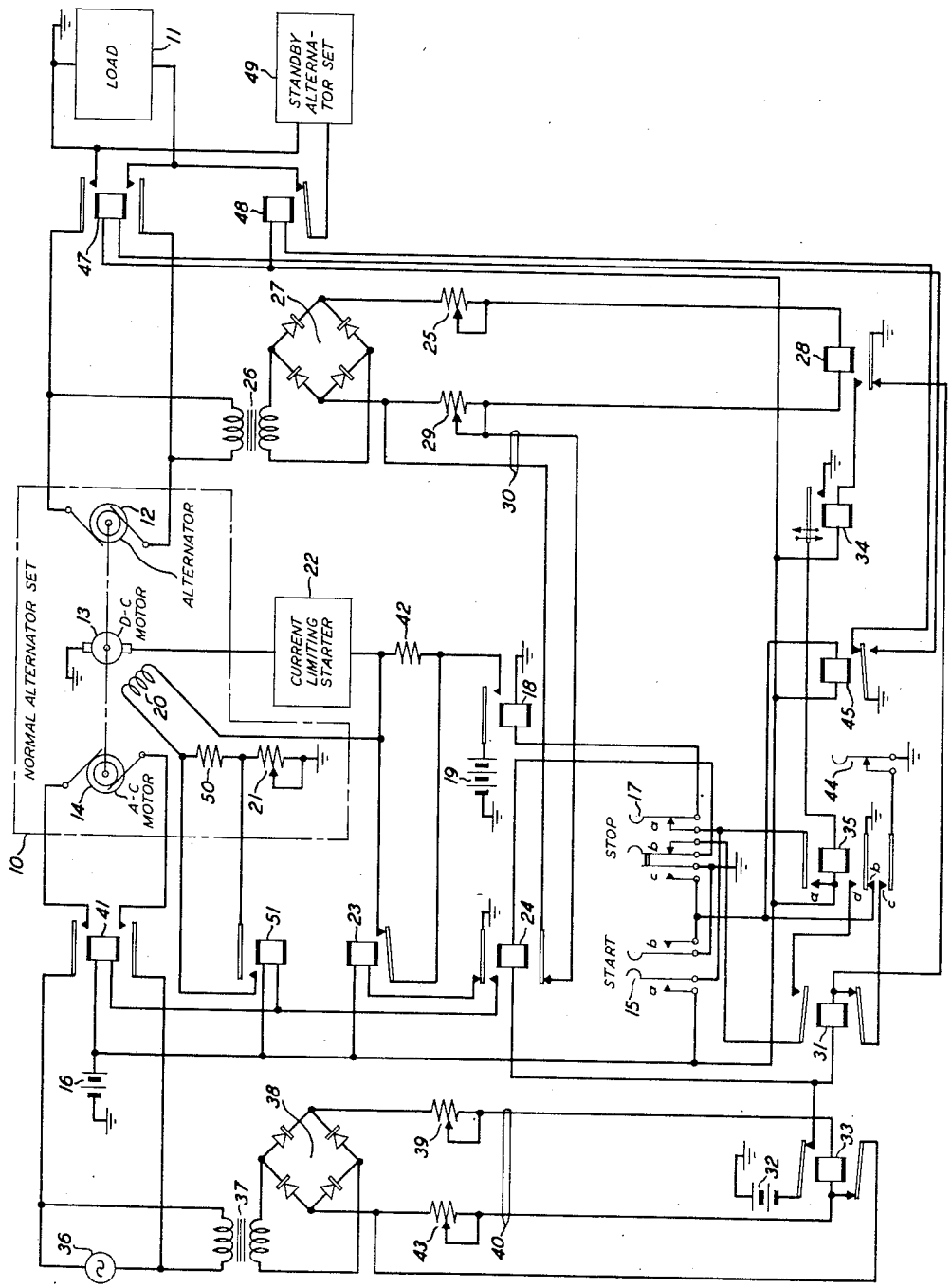
INVENTOR
H. H. SPENCER
BY
*G. F. Heuerman*
ATTORNEY Patented Dec. 29, 1953

2,664,538

UNITED STATES PATENT OFFICE 2,664,538

CURRENT SUPPLY APPARATUS

Harry H. Spencer, Springfield, N. J., assignor to Bell Telephone Laboratories, Incorporated, New York, N. Y., a corporation of New York Application September 12, 1951, Serial No. 246,267

5 Claims. (Cl. 322—9)

This invention relates to power supply systems and more particularly to an automatically controlled power plant for uninterruptedly supplying current to a load irrespective of failures or voltage fluctuations in excess of predetermined magnitudes of a primary commercial power supply source from which current is normally supplied to the power plant.

The invention is of use, for example, for supplying energizing current to equipment of a carrier current telephone system, which requires for its continuous operation an uninterrupted supply of alternating current the voltage of which remains within a predetermined amplitude range.

An object of the invention is to provide improved motor-generator apparatus for supplying current to a load without interruption or excessive voltage variation, irrespective of interruption or amplitude change of current normally supplied to a driving motor of said apparatus.

This invention is an improvement over the power supply system disclosed and claimed in United States Patent No. 2,518,394 granted to me August 8, 1950.

In accordance with an embodiment of the invention described herein for the purpose of illustration, an alternator for supplying current to a load has coupled to it an alternating-current motor and a direct-current motor for driving it. During normal operation, current is supplied from a commercial alternating-current source to the alternating-current motor causing it to drive the alternator. During a starting period and during periods when the voltage of the alternating-current source falls below a certain minimum value, the direct-current motor is energized by current from a battery to cause it to drive the alternator. A standby alternator set assumes the supply for the load if the alternator output voltage falls below a certain minimum value while the direct-current motor is driving the alternator.

Apparatus is provided for controlling the energization of the two motors and the standby alternator set under joint control of the alternator output voltage and the alternating-current supply line voltage. This control apparatus makes possible the transfer of the alternator drive from one motor to the other without introducing large amplitude voltage variations at the alternator output.

During the normal operating condition, when the alternating-current motor is driving the alternating-current generator and the direct-current motor, direct current is supplied to the field winding of the direct-current motor so that it may more readily take over the drive of the generator when the drive by the alternating-current motor is interrupted. In the arrangement disclosed in my prior patent, supra, the direct current is supplied to the field winding from the battery. In the modified arrangement in accordance with the present invention, the direct current is supplied to the field winding mainly from the driven armature of the direct-current motor, thereby reducing the battery drain during periods of normal operation, a resistor being provided in a common path connecting the battery to the armature and to the field of the direct-current motor. Means are provided for short-circuiting the resistor and thereby causing the armature to be energized from the battery when transferring to the direct-current motor drive, resistance being added to the field current circuit to maintain the field current at a desired amplitude.

The single figure of the drawing is a schematic view of a power plant embodying the invention.

Referring to the drawing, an alternating-current load 11 is connected to receive power either from a normal two-motor alternator set 10 comprising an alternator 12 mechanically coupled to a direct-current motor 13 and to an alternating-current motor 14, or, as shown in the drawing, from a similar standby alternator set 40. The normal supply set 10 is started initially by manually operating the start switch 15. This operation of contact $a$ of start switch 15 connects the holding battery 16 through the normally closed contact $a$ of stop switch 17 to the winding of relay 18, causing it to operate.

The operation of relay 18 connects the supply battery 19 to a circuit comprising the closed contact of a relay 23, the field winding 20 of direct-current motor 13, a resistor 50 and a rheostat 21, all in series. The operation of relay 18 also completes an energizing circuit for the armature of motor 13 from battery 19 through the closed contact of relay 23 and through a conventional current limiting starter 22. The resistance of the starter 22 is cut out in steps to bring the motor up to normal speed and the resistance remains cut out thereafter as long as the motor is running at approximately normal speed. The winding of relay 23 is energized by current from battery 19 when an operating circuit is completed through an armature and contact of relay 24, as shown.

When the terminal voltage of alternator 12 has reached a certain value, the current through the transformer 26, rectifier 27, and the winding of relay 28 will cause relay 28 to operate, this current being adjustable by the rheostat 29. With relay 24 deenergized, the rheostat 29 is short-circuited by the leads 30 through the lower contact of relay 24.

The operation of relay 28 removes ground from the winding of relay 31 causing relay 31 to release. While relay 28 is deenergized, relay 31 is operated by current from a holding battery 32 flowing in a circuit comprising an armature and contact of relay 33 and the armature and a contact of relay 28. The relay 33 is normally held operated by current from the commercial supply 36 flowing through transformer 37, rectifier 38, and rheostat 39, and when operated, connects the battery 32 to one terminal of each of the windings of relay 31 and 24. Rheostat 43 is short-circuited by the lead 40 through the lower contact and armature of relay 33.

The ground connection removed from relay 31 due to the operation of relay 28 is now applied to the winding of a slow acting relay 34 causing it to operate. Both relays 34 and 35 have one side of their windings connected to the holding battery 16. Relay 35 therefore operates when the operation of relay 34 connects ground to its winding. A holding circuit for the winding of relay 18 is established from the battery 16 through contact a of relay 35 so that the start switch 15 may now be released. Relay 34 is slow acting allowing relay 31 to release before the winding of relay 31 is grounded through contact c of relay 35.

Relay 35 in operating removes the ground connection through its contact b from the winding of relay 45, causing relay 45 to release when or if the start switch 15 is released. This release of relay 45 transfers a ground connection from the winding of relay 48 to the winding of relay 47. Both relays 47 and 48 have one side of their windings permanently connected to the holding battery 16 and, heretofore, relay 48 has been held operated to connect the load 11 to the standby alternator set 49. The ground connection transfer caused by the release of relay 45 causes relay 48 to release and relay 47 to operate. Relays 47 and 48 may be mechanically interlocked to prevent one from operating before the other releases. The release of relay 48 and the subsequent operation of relay 47 transfers the connection of the load 11 from the standby set 49 to the normal set 10.

The release of relay 31 connects ground through a contact d of relay 35 and through the normally closed contact b of the stop switch 17 to the winding of relay 24, causing it to operate if the voltage of the supply 36 is such as to maintain relay 33 operated. This operation of relay 24 removes ground from the winding of relay 23 causing it to release, and completes a circuit from ground through a contact of relay 24, the windings of relays 41 and 51 in parallel, and the battery 16, causing relays 41 and 51 to operate. The release of relay 23 removes the short circuit across resistor 42, the operation of relay 51 completes a short circuit across resistor 50 and the operation of relay 41 connects the alternating-current motor 14 to the alternating-current supply source 36.

Thus, during the normal operating condition when the alternating-current motor drives the alternator 12, there are three current paths connected in parallel, the first path being the battery 19 and resistor 42 in series, the second path being the armature of direct-current motor 13, and the third path being the motor field winding 20 and rheostat 21 in series. There is generated across the armature of direct-current motor 13 a voltage nearly equal to the voltage of battery 19. When the armature voltage is somewhat larger than the battery voltage, current will flow from the armature into the field winding and into the battery. When the battery voltage is somewhat larger than the armature voltage, current will flow from the armature into the field winding and from the battery into the field winding. In each case the current flowing into or out of the battery will be limited by the resistor 42 which may have a resistance of 50 ohms, for example. For a condition of full load on the alternating-current generator 12, of 21-kilowatt capacity, for example, the current supplied to the field winding 20 may be 1.8 amperes of which 1.66 amperes is supplied from the driven armature of motor 13 and 0.140 ampere from the battery 19. For a condition of light load on the generator 12, the motor field current may be reduced to 1.25 amperes, for example, of which 1.17 amperes is supplied from the motor armature and 0.080 ampere from the battery. In the arrangement disclosed in my Patent No. 2,518,394, the field current is supplied mainly from the battery even when the armature voltage is somewhat higher than the battery voltage and, when the battery voltage is higher, it also supplies current to the armature circuit. Thus with the present circuit arrangement, battery current drain is substantially reduced during normal operation when the direct-current motor is being driven by the alternating-current motor. Since field current of a correct value is being supplied to the motor 13 while it is being driven by the alternating-current motor, it is necessary only to operate relays 23 and 51 to condition the direct-current motor to assume the drive of alternator 12.

A decrease in the voltage of the supply source 36 below normal to a value determined by the adjustment of rheostat 39 will cause the relay 33 to release. This release will result in a transfer of motor drive from the alternating-current motor 14 to the direct-current motor 13 by removing the battery 32 from the winding of relay 24 causing it to release. The release of relay 24 removes ground from the windings of relays 41 and 51, causing these relays to release. Thus alternating-current motor 14 is disconnected from the supply source 36, the short circuit across resistor 50 is opened, and ground is reconnected to the winding of relay 23 causing it to operate and again short-circuit the resistor 42. Relays 33, 24 and 23 are very fast acting as compared to relays 34, 35 and 18 so that the motor drive is transferred to the direct-current motor 13 before the output voltage of the alternator decreases sufficiently to allow the series of relays 28, 34, 35 and 18 to release and disconnect the direct-current motor 13 from its supply battery 19.

The release of relay 33 also removes the short circuit from the rheostat 43, thereby increasing the resistance in circuit with the winding of relay 33. Relay 33 therefore will not reoperate until the voltage of supply 36 returns to a value above that at which relay 33 released, the exact value being dependent on the adjustment of the rheostats 43 and 39. The reoperation of relay 33 replaces the short circuit on rheostat 43 and returns the motor drive to the alternating-current motor 14 by the operation of relays 24, 51 and 41 and the release of relay 23 as hereinbefore described.

Emergency conditions, such as failure of the alternating-current motor 14 or the alternator 12, are safeguarded by the relay 28 which is adjusted to release at an alternator output voltage below normal and determined by the adjustment of rheostats 25 and 29. (While the alternating-current motor 14 is driving the alternator 12, the short circuit on the rheostat 29 is removed by the operation of relay 24, which relay must operate before the alternating-current motor 14 is connected to its supply 36.) Should the alternator 12 output decrease to this predetermined value, relay 28 will release, removing ground from the winding of relay 34 and applying ground to the winding of relay 31. Relay 31 will operate if the supply voltage 36 is normal so that the relay 33 is operated and will lock up to ground through contact c of relay 35 and the closed switch 44. Relay 31, in operating, will remove ground from the winding of relay 24, thus causing the motor drive to be transferred to the direct-current motor 13 as hereinbefore described. The release of relay 24 replaces the short circuit on rheostat 29, thus raising the current in circuit with the winding of relay 28 so that it reoperates and replaces the ground on the winding of relay 34. Relay 34, as previously described, is slow acting and does not release during the interval relay 28 is released.

The direct-current motor 13 drives the alternator 12 at normal output, if it is able to do so, and direct-current motor operation continues until the lock-up on relay 31 is removed by operating the switch 44. The switch 44 may be operated locally or by remote control means well known in the art. This operation will cause relay 31 to release which will in turn cause the motor drive to be again transferred to the alternating-current motor 14 as previously described.

But, if motor 13 on assuming the alternator 12 drive is unable to maintain the alternator 12 output voltage, relay 28 will again release at a voltage now determined by the adjustment of only rheostat 25 since rheostat 29 is short-circuited during direct-current motor operation by the release of relay 24. This voltage will be lower than that which caused relay 28 to release during alternating-current motor drive since the resistance in series with the winding of relay 28 has been decreased by short-circuiting rheostat 29. This removal of ground from the winding of relay 34 by the release of relay 28 will now allow relay 34 to release. The release of relay 34 causes relay 35 also to release by removing ground from its winding. The release of relay 35 removes the battery 16 from the starting relay 18 causing it to release and shut down the set by removing the supply battery 19 from the direct-current motor 13. The alternating-current motor 14 is disconnected from its supply 36 at the time of the motor drive transfer.

The release of relay 35 causing the alternator set 10 to shut down also reconnects ground to the winding of relay 45 through contact b of relay 35. Relay 45 will now operate since the one side of its winding is permanently connected to the holding battery 16. The operation of relay 45 transfers the ground connection through its armature from the winding of relay 47 to the winding of relay 48. As hereinbefore described, relay 47 will release, and, in turn, relay 48 will operate. The release of relay 47 and operation of relay 48 transfers the load 11 connection from the normal alternator set 10 to the standby set 49 running normally at no load. The set 49 then assumes the supply for the load 11.

The alternator set 10 may be stopped at any time by manually operating the stop switch 17. By this operation of the contact a of stop switch 17, the relay 18 will be released, causing the battery 19 to be disconnected from the direct-current motor 13. This operation of the contact b of stop switch 17 will disconnect the alternating-current motor 14 from its source 36, if it be so connected, by removing ground from the winding of relay 24, causing it to release. The release of relay 24 removes ground from relay 41 causing it to release and open its contacts and thus deenergize the alternating-current motor 14. The operation of the contact c of the stop switch 17 connects ground to the winding of relay 45 causing relay 45 to operate and transfer the connection of the load 11 from the normal set 10 to the standby set 49 as hereinbefore described. A holding circuit for relay 45 will be obtained by the ground connection of contact b of relay 35 when relay 35 releases.

For the purpose of performing tests or maintenance on the alternator set 10 while it is running, the load may be momentarily transferred to the standby set 49 by holding the start switch 15 depressed. This connects ground to the winding of relay 45 through the contact b of the start switch 15 causing relay 45 to operate and transfer the load 11 connection to the standby set 49. The release of the start switch 15 returns the load 11 connection to the normal set 10 by causing the release of relay 45.

What is claimed is:

1. Means for driving a generator comprising an alternating-current motor, a direct-current motor having a field winding and an armature, means for mechanically coupling said alternating-current motor and said direct-current motor to said generator, a direct-current source, a first and a second resistor, a first circuit comprising in series said direct-current source, said first resistor and said armature, a second circuit comprising in series said direct-current source, said first resistor, said field winding and said second resistor, means for causing said direct-current motor to drive said generator comprising means for completing a short-circuiting path across said first resistor, and means for transferring the drive from said direct-current motor to said alternating-current motor comprising means for opening said short-circuiting path across said first resistor, means for completing a short-circuiting path across a portion at least of said second resistor and means for supplying current from an alternating-current source to said alternating-current motor.

2. Driving means for a generator comprising an alternating-current motor and a direct-current motor, means for mechanically coupling both said motors to said generator, said direct-current motor having an armature and a field winding, means for supplying alternating current from a supply source to said alternating-current motor to cause it to drive said generator and said direct-current motor, a direct-current source, a resistor, and a circuit having three parallel branch paths, a first of said paths comprising said direct-current source and said resistor in series, a second of said paths comprising said armature, and the third of said paths comprising said field winding.

3. Driving means in accordance with claim 2 in which said third path comprises resistance in series with said field winding.

4. Driving means in accordance with claim 2 in which there are provided means for transferring the drive from said alternating-current motor to said direct-current motor comprising means for short-circuiting said resistor and means for substantially simultaneously interrupting the supply of current from said supply source to said alternating-current motor.

5. Driving means in accordance with claim 4 in which said third path comprises resistance in series with said field winding and in which means are provided for increasing said resistance at substantially the same time that said resistor in series with said direct-current source is short-circuited.

HARRY H. SPENCER.

References Cited in the file of this patent

UNITED STATES PATENTS

| Number | Name | Date |
| --- | --- | --- |
| 2,518,394 | Spencer | Aug. 8, 1950 |